(No Model.) 2 Sheets—Sheet 1.

C. G. SCHMIDT.
MEAT CHOPPER.

No. 499,755. Patented June 20, 1893.

Attest
L. N. Coffin
Chas. M'Carthy

Inventor
Charles G. Schmidt
by Chas. Spengel Atty.

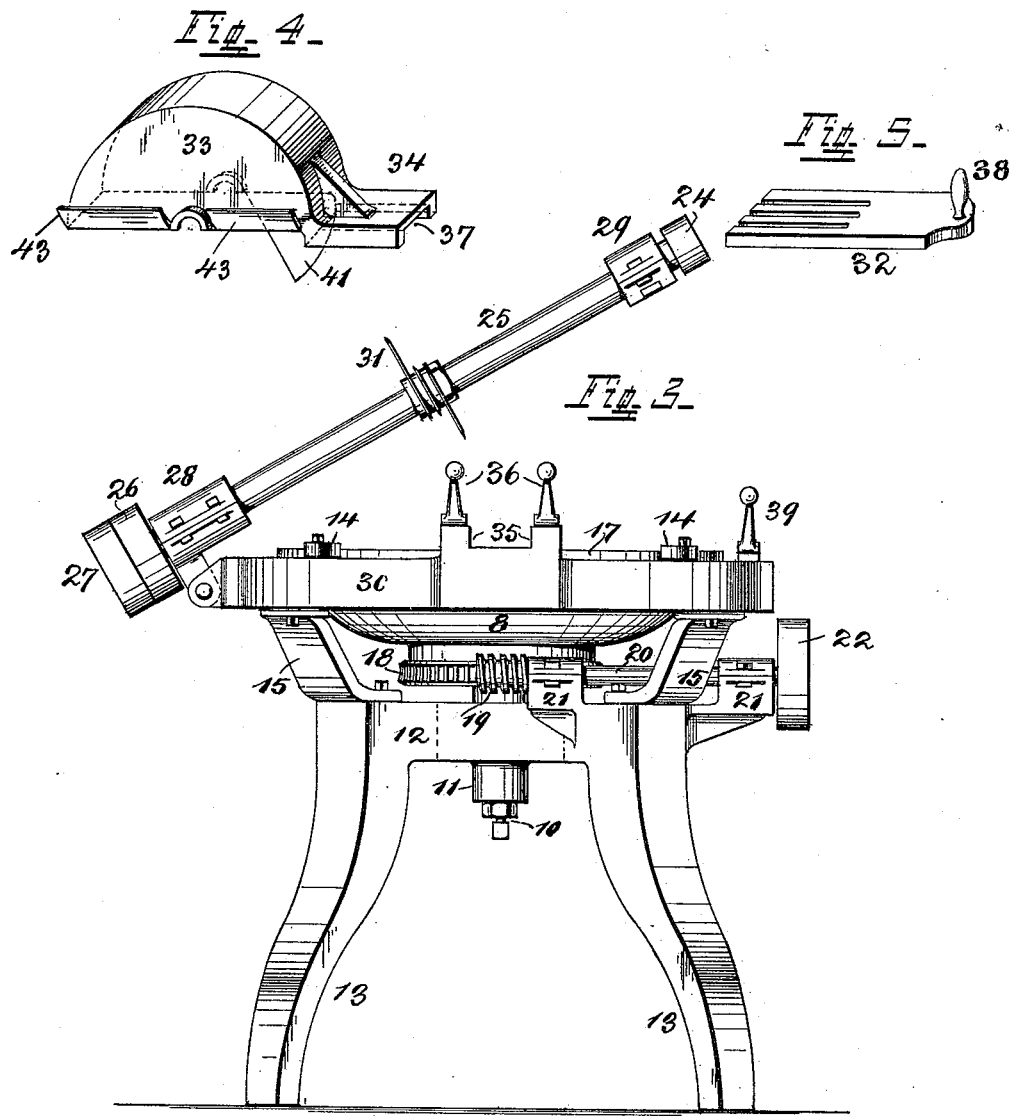

UNITED STATES PATENT OFFICE.

CHARLES G. SCHMIDT, OF CINCINNATI, OHIO.

MEAT-CHOPPER.

SPECIFICATION forming part of Letters Patent No. 499,755, dated June 20, 1893.

Application filed March 21, 1893. Serial No. 467,020. (No model.)

*To all whom it may concern:*

Be it known that I, CHARLES G. SCHMIDT, a citizen of the United States, residing at Cincinnati, in the county of Hamilton and State of Ohio, have invented certain new and useful Improvements in Meat-Choppers; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to machines whereby meat is reduced or chopped to a consistency to make it suitable to be used for sausages or similar purposes. One of the most important requirements of such machines is simplicity and easy accessibility for the purpose of permitting the convenient handling of the meat, and primarily to be enabled to keep all parts of these machines perfectly clean. Scrupulous cleanliness is absolutely essential in such machines because the smallest quantity of meat, if given opportunity to decompose, by remaining too long in some obscure corner where it escapes detection, is apt to spoil a whole batch of meat, when permitted to come in contact therewith. Where such machines are complicated by being encumbered with many parts, their cleansing becomes difficult, consumes a good deal of time, and thereby induces neglect on the part of attendants. To overcome these objections, I have invented a machine where the number of the parts is reduced to the possible lowest minimum consistent with stability and requirements of service, such parts at the same being arranged in a way to be removable and accessible to expose their and adjoining surfaces, to permit them to be readily reached for the purpose of cleaning.

Other features of my invention relate to the manner of supporting and guiding the principal rotating parts, in order to reduce friction, and to the general features of the construction, all of which will appear more fully hereinafter.

In the following specification is found a full description of my invention, the same being also particularly pointed out in the claims at the end thereof, and its construction illustrated in the accompanying drawings, in which—

Figure 1:
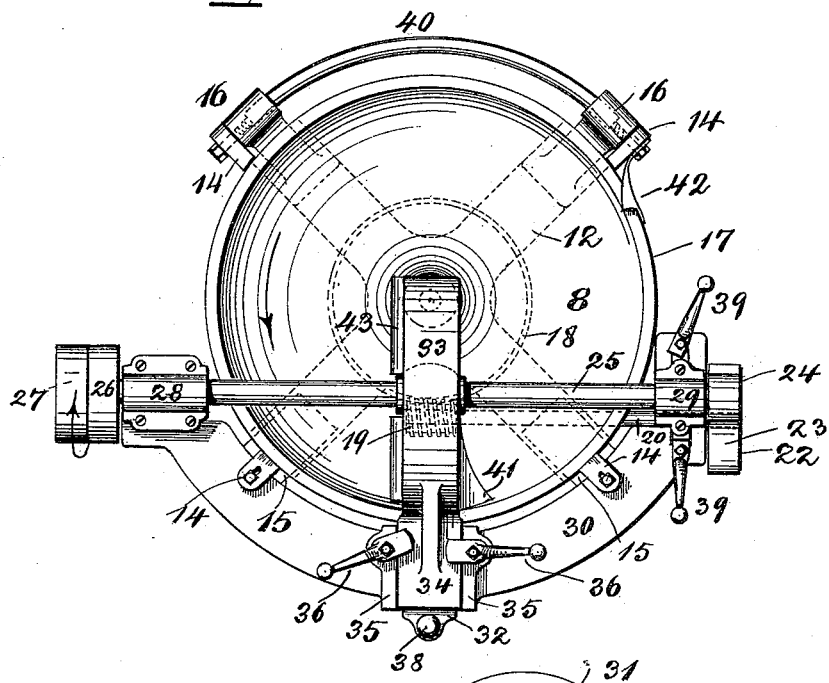
Figure 2:
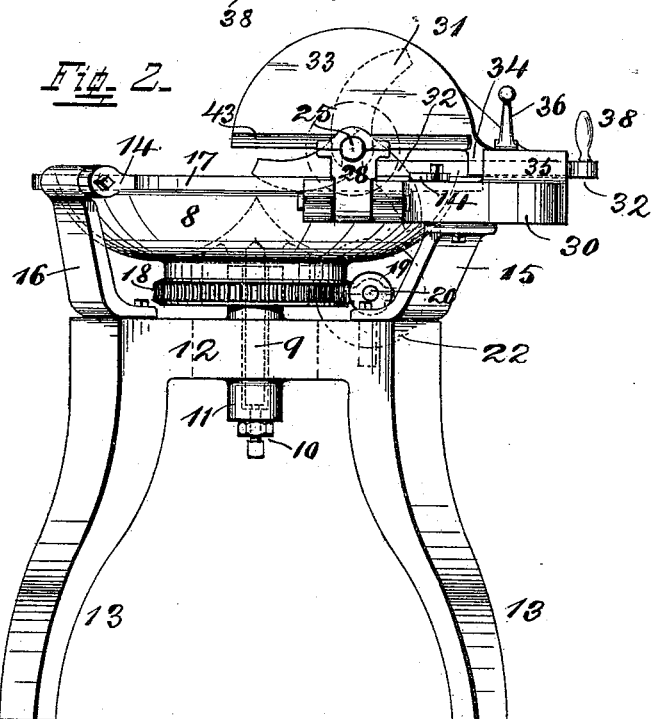

Figure 1. is a top view of my machine. Fig. 2. is an elevation of the same, showing that side of it from which it is driven. Fig. 3. is a rear view showing some parts omitted and others adjusted to put the machine, in a condition ready for cleaning. Figs. 4. and 5. are perspective views of the hood and knife-stripper respectively.

8 is the bowl, receiving the meat to be reduced, and is of the customary form and interior shape used in machines of this kind. It is supported on one point only, which is in its center, where it rests on a pin 9, which rests in turn again on the point of a screw 10, which passes through the lower end of a boss 11. This latter forms preferably a part of the general machine frame, which consists substantially of a spider-shaped top 12, each corner or extremity of which is supported by a leg 13. The bore of this boss is considerably larger than the diameter of pin 9, so that this latter does not come in contact therewith, and the unavoidable friction is thus limited to the very small point of contact between screw 10, and pin 9. The bowl is held to this central position by guide pieces 14, supported on brackets 15—15 and 16—16, which brackets are secured to top 12. The position of these guide-pieces is adjustable with reference to the bowl, which permits them to be moved in a way to compensate for the wear between these parts, and to take up, respectively prevent lost motion. That part of the bowl which comes in contact with these guide pieces is preferably re-inforced by a rim 17. The bowl is rotated in order to pass the meat therein repeatedly through the action of the knives, by a worm wheel 18, secured thereto and driven by a worm 19, on a shaft 20. This latter rests in bearings 21, on frame 12, and has a pulley 22, whereby it is driven by means of a belt 23, from a pulley 24, on knife-shaft 25. This latter shaft has tight and loose pulleys 26, 27, whereby it receive its motion from a suitable motor, and it revolves in boxes 28, 29, which rest normally on a supplementary frame 30, supported on brackets 15.

The knives 31, are of the customary shape and secured to shaft 25, in any suitable manner.

32 is a knife-stripper or comb provided with slots through which the knives pass while rotating. They are thereby constantly kept clear of accumulating meat, this comb also furnishing the necessary resistance for the knives to cut against when encountering the tougher parts of the meat.

That part of the path of the knives which is above the bowl is surrounded by a hood 33, which catches any meat thrown off by the knives which would otherwise fly promiscuously about. It is provided with an extension 34, which fits between ways 35, on frame 30, which in conjunction with two locking levers 36, hold the hood in position. The comb 32, is held in place by this extension 34, of the hood, which is cut out below as shown at 37, and within which cut-out the comb fits. For its convenient removal it is provided with a handle 38. Hood, comb, knives and bowl are the parts to be particularly kept clean and therefore they should be readily accessible to enable such to be done. The hood may be completely taken off by turning levers 36, in a way to release extension 34, as shown in Fig. 3. This also liberates the comb, exposing these parts and the surfaces upon which they have been resting. The removal of these two parts also gives access to the knives. To be enabled to completely clean the bowl, box 28, of shaft 25, is hinged to frame 30, so that when the other box is released from this frame, to which it is held by locking levers 39, and further if the belts are thrown off from the pulleys, this shaft may be swung up and out of the way as best shown in Fig. 3. Pulleys 26 and 27, on one side of box 28, are expected to balance so nearly with the parts on the other side that the manipulation of the shaft is readily accomplished.

40 is a rail, supported by brackets 16, and prevents the attendant from coming in contact with the rotating bowl when manipulating the meat while the machine is in operation.

41 is a scraper forming a part of the hood, and serves to prevent the meat from crowding up and over the sides of the bowl, throwing it also toward the center of the latter to be more readily acted upon by the knives.

42 is an additional scraper, which keeps the top and sides of rim 17, clear and prevents meat from working between it and guide-pieces 14.

43 is a lip projecting out from hood 33 and prevents the meat from crowding upon the latter.

It will be observed that this construction conforms to all the requirements set out at the beginning of this description, and which such machines should possess. The parts are reduced to the ones absolutely necessary, the operating shafts are all on one side, leaving the other side free to approach the bowl for manipulating the meat, the means for guiding the bowl are condensed in a manner to not only reduce the friction, but also leave the latter open on all sides affording thus full observation, and all the parts are adjustable and removable in a manner to permit them to be readily and thoroughly cleaned.

Having described my invention, I claim as new—

1. In a meat-chopper the combination of a frame 12, a bowl centrally supported, means to guide and hold it in its central position, a knife-shaft provided with knives and revolving in two boxes, a supplementary frame 30, to which one of these boxes is hinged, means to lock the other box to this frame, a hood, a knife-stripper and means to actuate the knife-shaft and bowl.

2. In a meat-chopper the combination of a frame 12, a rotary bowl centrally supported thereon, means to guide the latter and hold it to its central position, a rotary knife-shaft, provided with knives, brackets 15—15, a supplementary frame 30 supported thereon, and having ways 35, a hood 33, provided with an extension 34, fitting in between these ways, locking levers 36, to hold it in position therein, and a comb or knife-stripper 32, fitting into a cut-out 37, in extension 34, of hood 33, and held thereby in position.

3. In a meat-chopper the combination of a frame 12, a bowl centrally supported thereon, means to guide it and hold it to its central position, brackets 16, on frame 12, a hand-rail 40, supported by them, and passing around the front of the bowl, brackets 15, on the rear side of the latter, a supplementary frame 30, supported by them and being on the side opposite to rail 40, a knife-shaft, hood and comb 32, supported by frame 30, means to rotate the knife-shaft, a worm-wheel 18, secured to the bowl, a worm and shaft for driving it, the latter being parallel with the knife-shaft and below it, said two shafts being back of the center of the bowl, remote and opposite to rail 40, and means operatively connecting the two shafts for the purpose of rotating the worm-shaft.

4. In a meat-chopper the combination of a frame 12, a rotating bowl supported thereon, brackets 16—16, and 15—15, on said frame, a supplementary frame supported by brackets 15—15, a rotating knife-shaft, hood and comb supported by this frame, guide pieces also secured thereto and to brackets 16—16, a scraper 41, secured to hood 33, and reaching into the bowl, and a scraper 42, secured to one of brackets 16, to keep the rim of the bowl clean.

In testimony whereof I affix my signature in presence of two witnesses.

CHARLES G. SCHMIDT.

Witnesses:
CHAS. SPENGEL,
CHAS. MCCARTHY.